Oct. 27, 1936.  M. H. ARMS ET AL  2,058,940
METAL CUTTING MACHINE
Filed Aug. 30, 1934  7 Sheets-Sheet 1
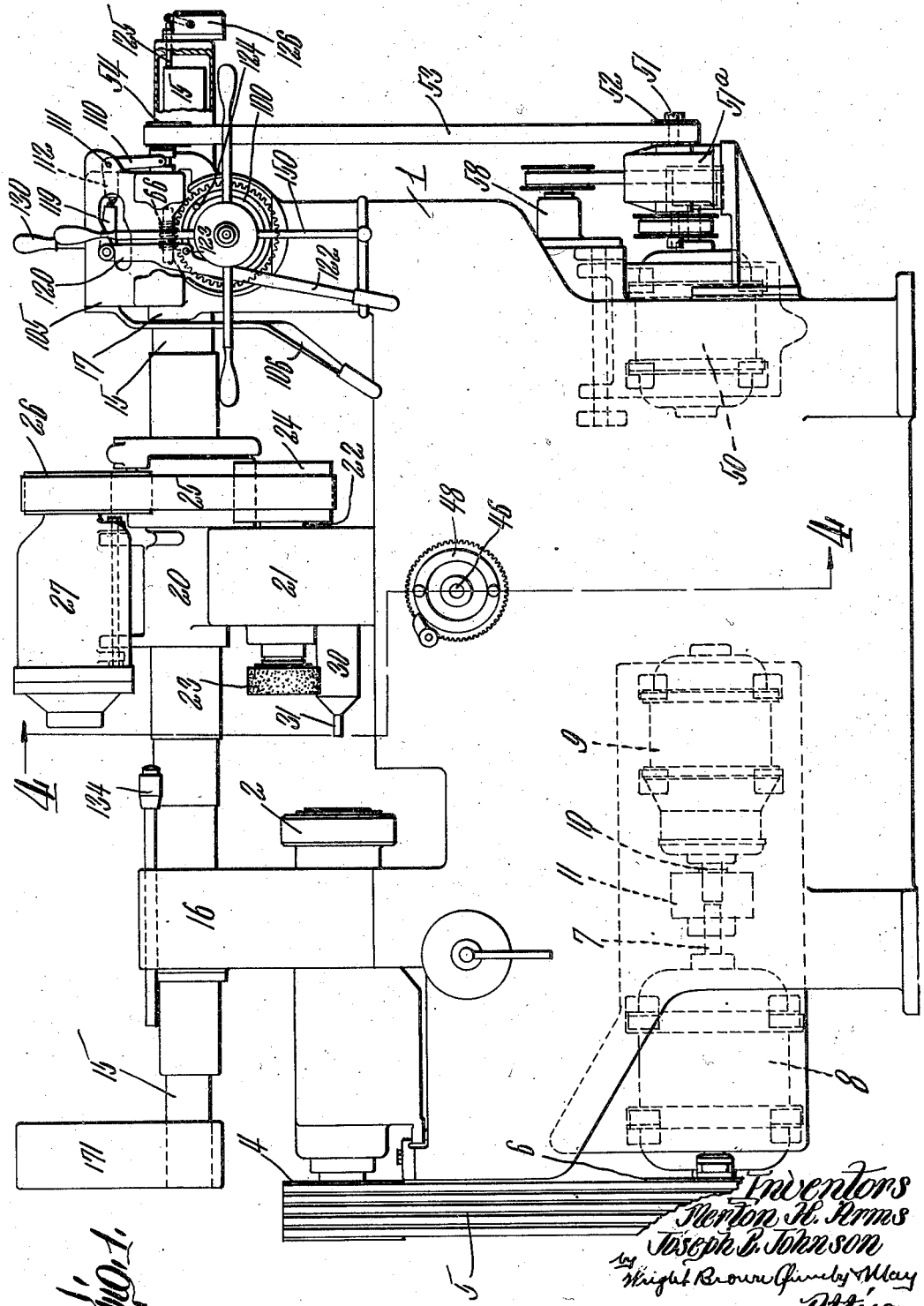

Oct. 27, 1936.    M. H. ARMS ET AL    2,058,940
METAL CUTTING MACHINE
Filed Aug. 30, 1934    7 Sheets-Sheet 2
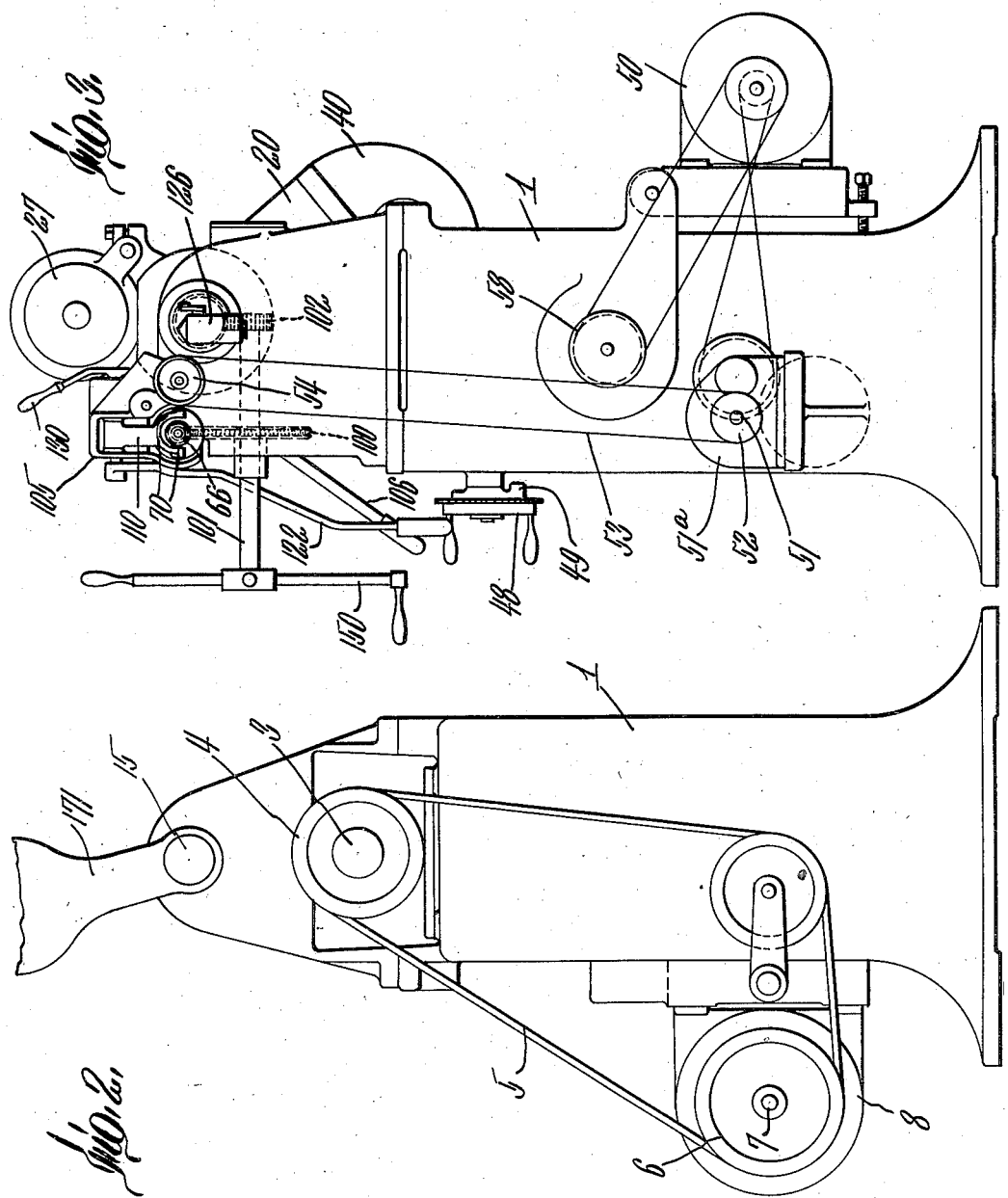
Inventors
Merton H. Arms
Joseph P. Johnson
by Wright Brown Quimby & May
Attys

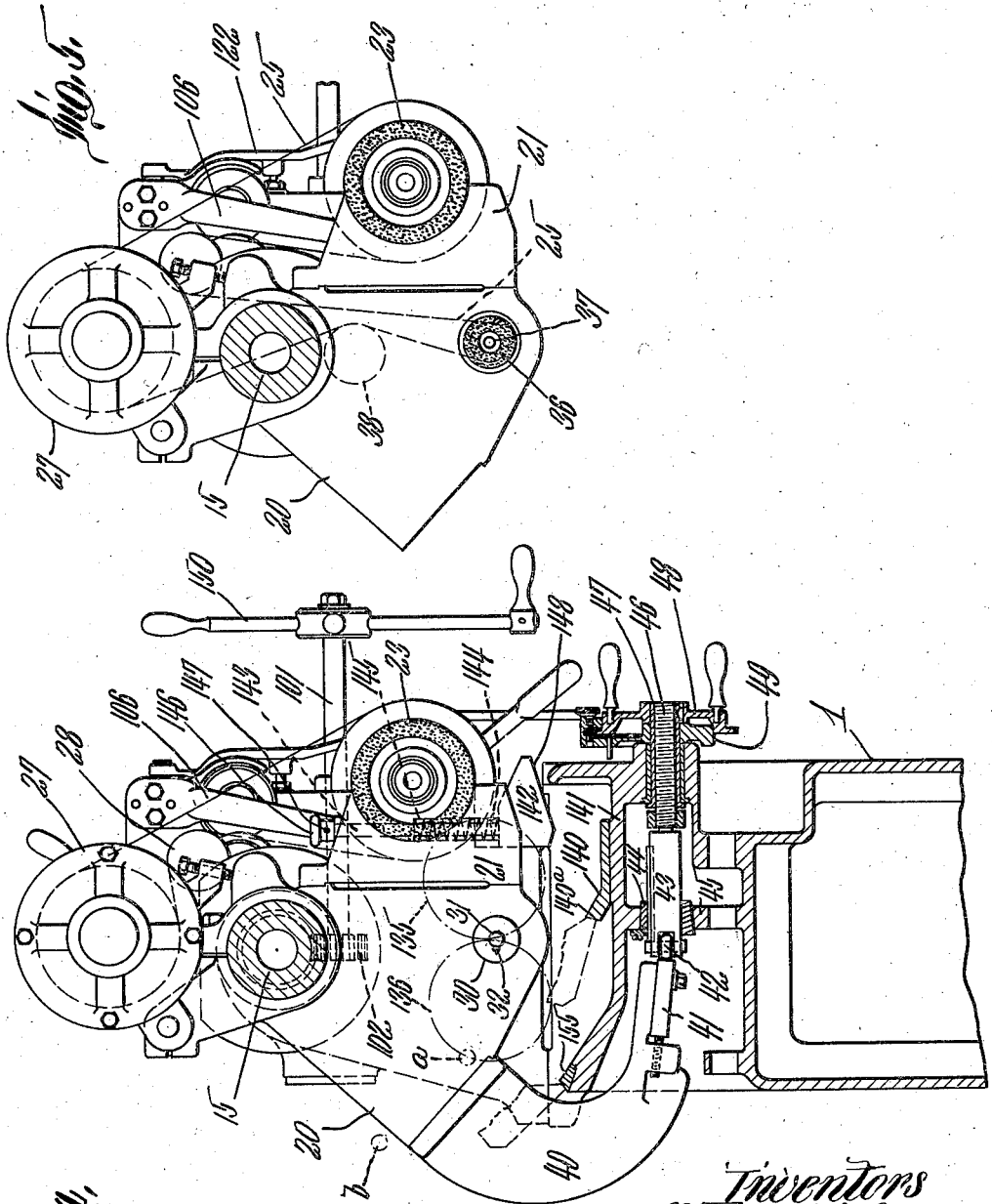

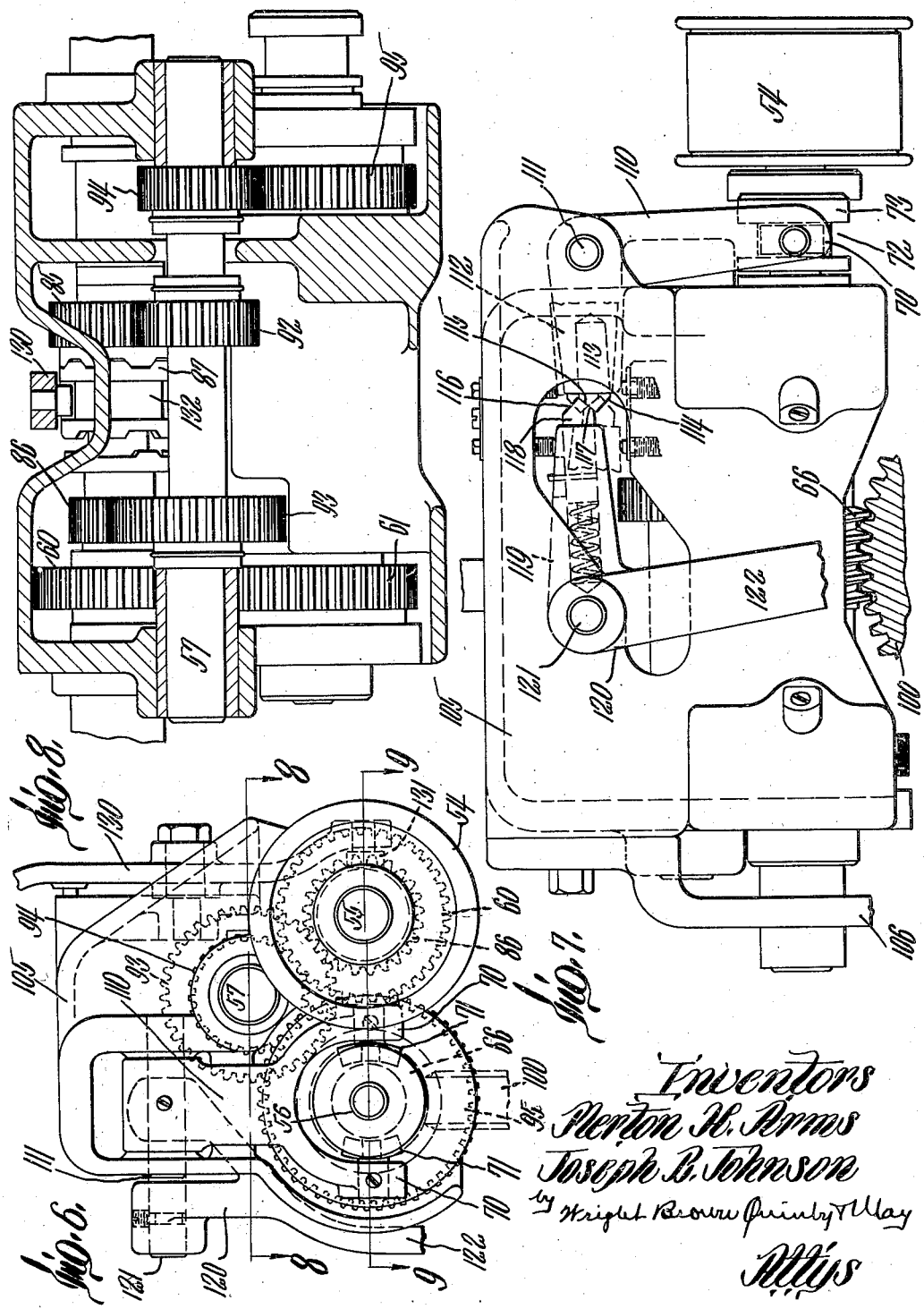

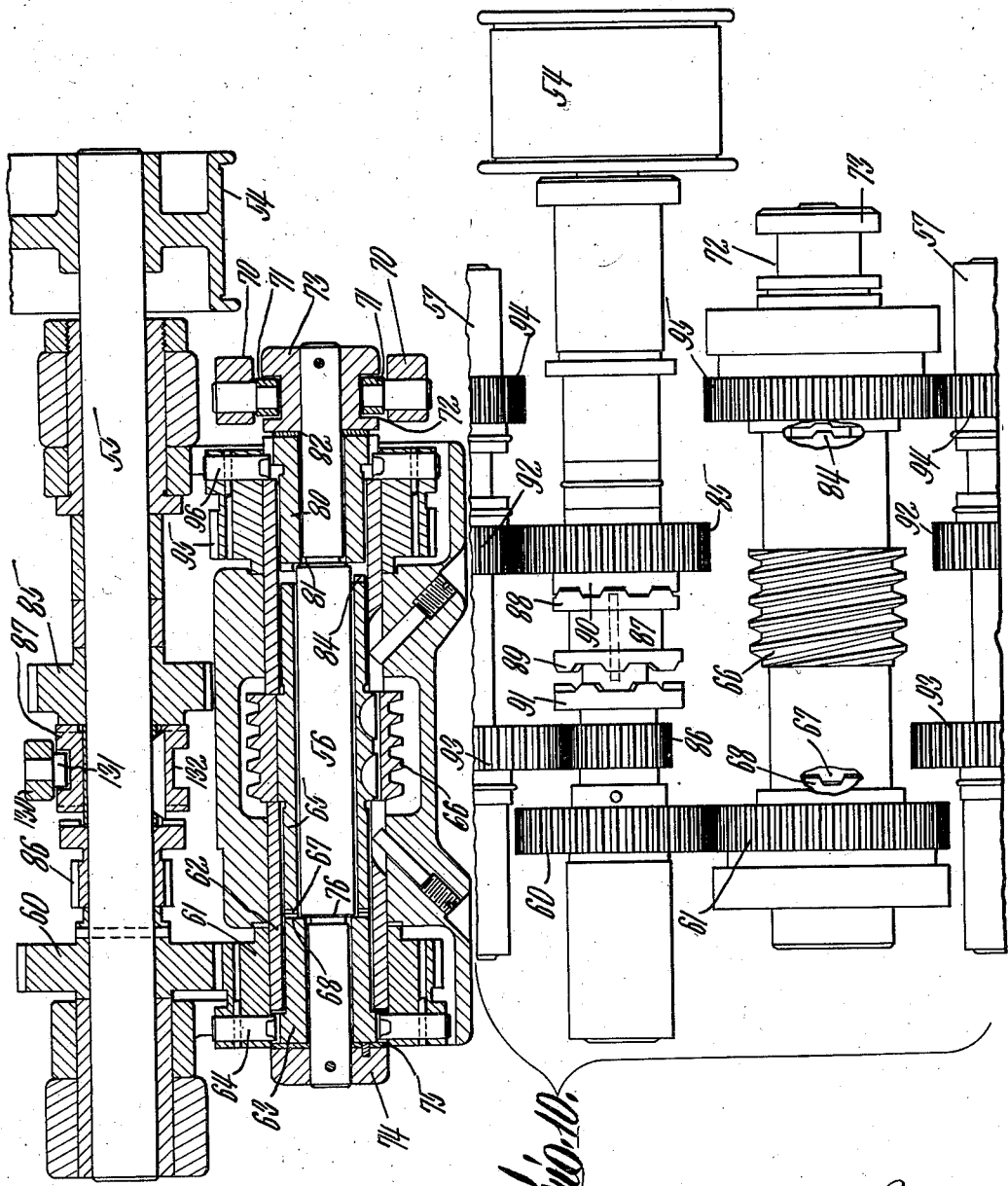

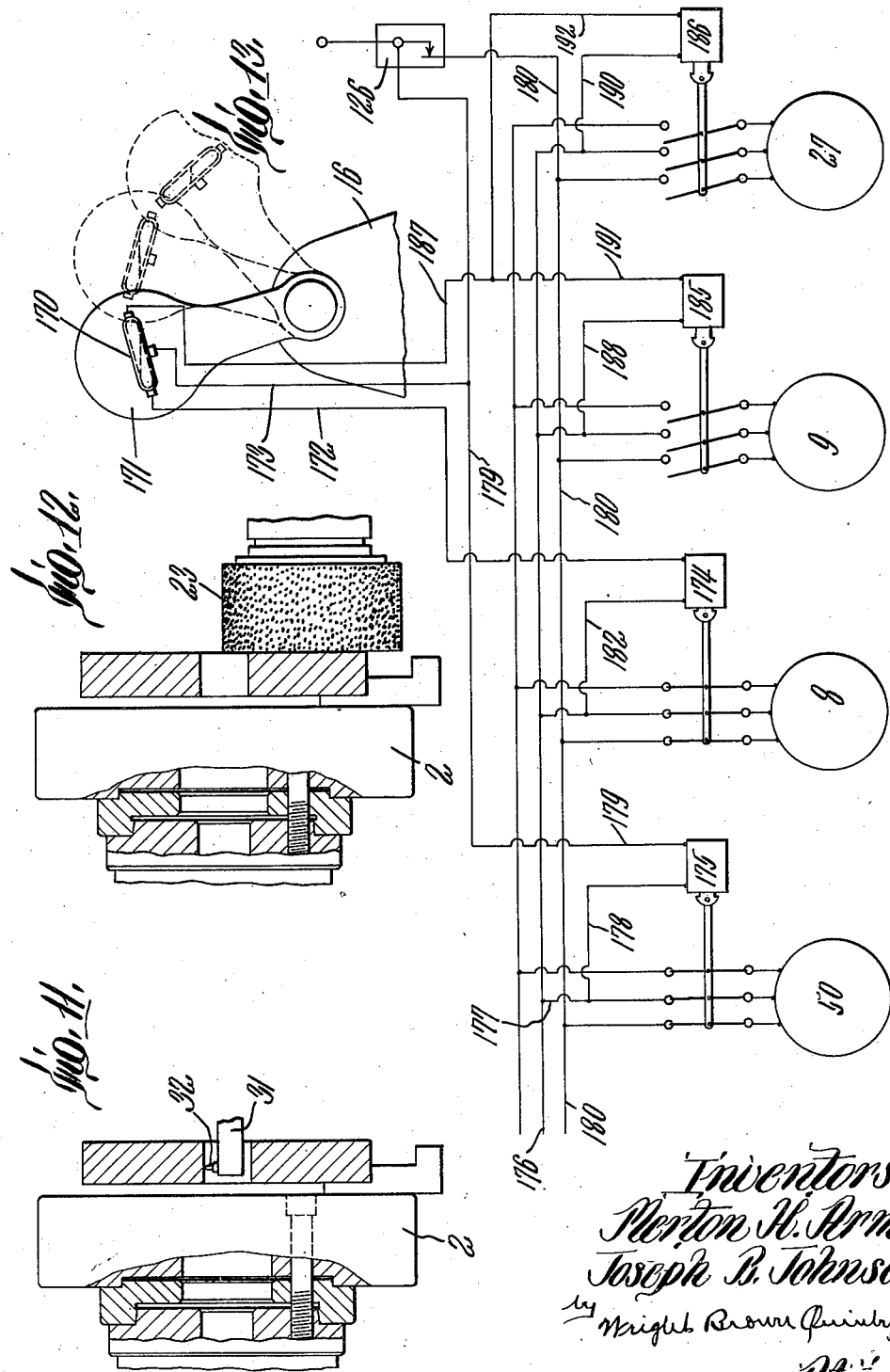

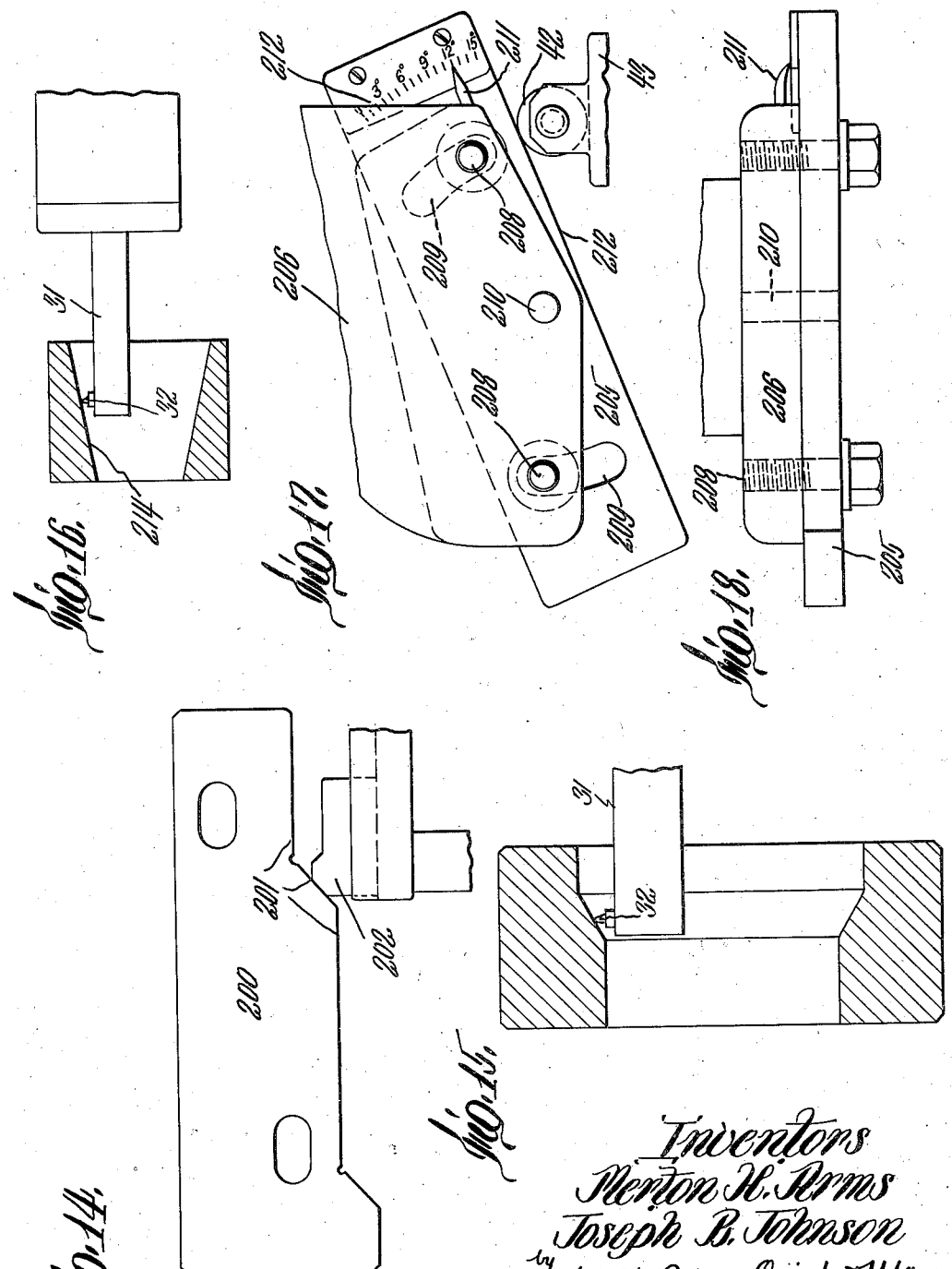

Patented Oct. 27, 1936

2,058,940

UNITED STATES PATENT OFFICE 2,058,940

METAL CUTTING MACHINE

Merton H. Arms and Joseph B. Johnson, Springfield, Vt., assignors to Bryant Chucking Grinder Company, Springfield, Vt., a corporation of Vermont Application August 30, 1934, Serial No. 742,128

30 Claims. (Cl. 29—28)

This invention relates to metal cutting machines, and more particularly, but not exclusively, to such machines in which at least a part of the cutting is accomplished by grinding.

One of the objects of this invention is to provide a machine well adapted during the cutting cycle to bore the work with a boring cutter and end face the work with a grinding wheel.

A further object is to provide such a machine wherein to a considerable extent standard parts of a well known form of grinding machine may be employed, requiring only certain additions and slight modifications for boring.

A further object is to provide controls of position and speed of operation of the tool and work most suitable for the particular operation being performed at any time.

A further object is to provide for high accuracy, insuring the production of true holes and squared end facing. This latter object is produced by rotating the work while holding the boring tool against rotation, whereby the boring tool cannot generate its own cylindrical surface which might be out of alinement with the work axis. Each tool produces a face accurately symmetrical to the rotational axis of the work and these faces are thus accurately related to each other.

For a more complete understanding of this invention, reference may be had to the accompanying drawings in which Figure 1 is a front elevation of the machine partly broken away.

Figures 2 and 3 are left and right end elevations, respectively, thereof.

Figure 4 is a detail section on line 4—4 of Figure 1.

Figure 5 is a view similar to a portion of Figure 4, but showing a modification.

Figure 6 is a fragmentary end elevation of a portion of the machine shown in Figure 3, but to a larger scale.

Figure 7 is a fragmentary front elevation of the parts shown in Figure 1, but to a larger scale and with parts removed.

Figures 8 and 9 are detail sections on correspondingly numbered section lines of Figure 6.

Figure 10 is a diagrammatic view of the gear train mechanism shown in Figures 6, 8 and 9.

Figures 11 and 12 are detail views partly in elevation and partly in section, Figure 11 showing the boring tool in operation, and Figure 12 showing the grinding facing wheel in operation.

Figure 13 is a wiring diagram showing the motor control.

Figure 14 is a plan view of a former cam and follower for forming a hole of various diameters in different portions of its length.

Figure 15 is a fragmentary view partly in section showing the form of the hole produced by the use of the parts shown in Figure 14.

Figure 16 is a view similar to Figure 15, but showing a longitudinally tapered hole.

Figure 17 is a plan view of an adjustable form of cam and follower for forming a hole of the type shown in Figure 16.

Figure 18 is an edge view of the parts shown in Figure 17.

Referring to the drawings, at 1 is shown a machine base having mounted therein adjacent to one end at its upper face a rotary work holder 2 which may be any suitable form of chuck for supporting work. This chuck is mounted on a work spindle 3 which, as shown, is provided at its outer end with a pulley 4 about which passes a driving belt 5.

As shown best in Figure 2, this belt passes about an idler and about a drive pulley 6 mounted on a motor shaft 7. This motor shaft 7 may be the armature of a relatively high speed motor 8. In alinement with this motor 8 is a relatively low speed motor 9, the armature shaft 10 of which is coupled to the shaft 7 by means of any suitable form of over-running clutch 11. Thus when the motor 9 is energized and the motor 8 is not energized, the work support 2 is driven at a relatively low speed from the motor 9, but when the motor 8 is energized the work holder 2 is rotated at a relatively high rate of speed, the shaft 7 running ahead of the shaft 10 in view of the over-running clutch 11. Thus two speeds of rotation of the work holder are provided, depending on which one of the motors 8 or 9 is energized.

Above the spindle shaft 3 and in parallel relation therewith is mounted the rockable axially movable shaft 15, mounted to rock and slide in bearing members 16 and 17 at opposite end portions of the machine. This shaft 15 between the bearings 16 and 17 carries a tool carrier 20. To one side face of the carrier is shown secured a member 21 which has journaled therein a spindle 22 for a face grinding wheel 23, which is secured at the end of this spindle nearest to the work holder 2. This spindle may be rotated by any suitable means. The machine so far described may be constructed substantially as shown in the Bryant Patent No. 1,051,483. As herein shown a belt pulley 24 is secured to the opposite end of the spindle 22 and over this belt pulley passes a belt 25 which extends about a drive pulley 26 of a motor 27 and an idle pulley 28 (see Figure 4). The motor 27 is shown as mounted on the tool carrier 20. The main portion of the carrier 20 may be provided with a tool bar 30 which may carry at its outer end the boring tool 31. Preferably this boring tool is provided with a diamond cutting point 32 at its outer end.

The tool bar 30 may be made interchangeable with the grinding wheel unit comprising the interal grinding wheel 36 mounted on the shaft 37 shown in Figure 5, and as illustrated in the Bryant Patent No. 1,051,483, to which reference has been made. Where the grinding wheel unit is used, the belt which drives the face grinding wheel 23 may also be extended to pass around a pulley on the internal grinding shaft 37 and also upon an idler 38, this being also as shown in the Bryant patent. The tool carrier 20 is shown as provided with an arm extension 40 carrying at its lower inner end a former cam 41 which may ride on a roller 42 journaled at the inner end of a feed slide 43. This feed slide is mounted for axial movement through a bushing 44 in a frame member 45 of the machine and has a threaded extension 46 for threaded engagement with a feed sleeve 47. This feed sleeve has keyed to its outer end an actuating hand wheel 48 and loosely journaled on the sleeve is a member 49 which may be actuated automatically, as illustrated in the Bryant patent, to turn the wheel 48, thus to move the slide 43 and cause a feed of the tool with reference to the work at each end of the traverse. This feed mechanism is so positioned as to control the feed of the boring tool 32, which, when the former cam 41 rests against the roller 42 is in operative alinement with the work carried by the work holder 2, and suitable means may be provided, when the tool carrier is in this angular position, to effect working traverse between the tool and the work.

As shown this traversing means is operated by a motor 50 (see Figure 1) which rotates a drive shaft 51 of a speed reduction unit 51a, and it may also drive the coolant pump 58. This drive shaft has a pulley 52 thereon which is connected through a driving belt 53 with a pulley 54 at the upper part of the machine. As best shown in Figures 9 and 10, this pulley 54 is carried by a jack shaft 55 which is arranged to drive a worm 66 either directly to rotate it in one direction or through a reversing shaft in the opposite direction, so as to effect traverse in opposite directions.

The boring tool, particularly one of the diamond point type, traces a very narrow path on the work so that in order to produce a smooth cut it is necessary that the feed motion be relatively slow. In order that this may be accomplished, but at the same time that the roughing cut may be made quickly, provision has been made so that the first cut of the boring tool may be effected under rapid feed and then a second cut be made under a slow feed to produce a finished cut. To this end, provision is made for entering the boring tool from one face of the work and traversing it to the desired extent at a relatively high rate of speed to produce a roughing cut and then retracting the tool at a relatively low rate of speed to effect a finishing cut, and the transmission mechanism for effecting traverse of the tool carrier is thus provided so that when the drive is through the reversing shaft 57 it can be made at either of two speeds, one of which is substantially that of the traverse into the work and the other is at a speed of traverse materially lower, say, substantially half the entering speed.

The mechanism for accomplishing these results will now be described. The jack shaft 55 has keyed thereto a gear 60 which meshes with a gear 61 journaled on a sleeve 62. This sleeve surrounds at one end a clutch sleeve 63 to which the gear 61 is keyed as by the driving pin 64. This sleeve 62 also encloses one end portion of a sleeve 65 which has keyed thereto a worm 66.

The sleeve 65 is rotatable on the shaft 56. The left hand end of the sleeve 65 is provided with a clutch face at 67 which meshes with a mating clutch face 68 on the inner end of the clutch sleeve 63 and the shaft 56 is arranged to be moved axially as by the shifting of a shifter fork 70 which is provided with a pair of shoes 71 engaging in a groove 72 in a shifter collar 73 which is secured to the shaft 56 as by a pin. When the collar 73 is moved to the right, as shown in Figure 9, the clutch sleeve 63 is in clutching engagement with the sleeve 65 and thus the worm 66 is driven from the jack shaft 55 through the gear 60 and the gear 61. The opposite end of the shaft 56 from the shaft collar 73 has pinned thereon a stop collar 74 to the inner face of which is secured a wear disk 75, the sleeve 63 being held between this wear disk and a shoulder 76 on the shaft 56 so that the clutch sleeves 63 are caused to move axially with the shaft 56.

In order to effect traverse in the reverse direction, the shaft 56 is moved axially to the left so as to bring a clutch collar 80, journaled thereon between the shoulder 81 on the shaft 56 and a wear plate 82 on the inner face of the collar 73, into clutching engagement with clutch teeth 84 on the right hand end of the sleeve 65, this motion of the shaft 56 uncoupling sleeve 63 from the worm 66 so that the gear 60 on the jack shaft 55 is no longer able to rotate the worm. In this position of the parts the reversing shaft 57 is driven through either of the gears 85 and 86 journaled on the shaft 55 and which may be selectively clutched to rotate therewith by suitably positioning the clutch collar 87, which is keyed to the shaft 55 and which has clutch elements 88 and 89 selectively coupled to clutch elements 90 and 91 fixed to rotate with the gears 85 and 86, respectively. The gear 85 is larger than the gear 86 and meshes with a pinion 92 on the reversing shaft 57 while the gear 86 meshes with a gear 93 on this same shaft.

When the clutch collar 87 is thrown to the right as in the position shown in Figures 9 and 10, the gear 85 is being driven so that the reverse shaft 57 is being driven at a relatively high rate of speed, while when the clutch 87 is moved to the left so as to rotate the gear 86, the reverse shaft 57 is driven at a lower speed. This reverse shaft carries a gear 94 which meshes continuously with a gear 95 keyed through the pin 96 to the clutch sleeve 80. When the shaft 56 is thus in its left hand position, the worm 66 is driven in the reverse direction to that in which it is driven when the shaft 56 is in its right hand position and at either of two speeds, depending on the position of the clutch collar 87. When this collar 87 is at the right the worm being driven at substantially the same speed as it is driven through the gears 60 and 61 in the opposite direction, and when this clutch collar 87 is in its left hand position, it is driven at a lower speed, in the relationship shown this speed being substantially half that for the other direction of rotation of the worm 66. The speed control clutch collar 87 may be controlled manually as through a handle 130 carrying at its lower end a roller 131 engaging in a peripheral groove 132 in a clutch collar 87. The worm 66 normally drives a worm wheel 100 fixed to a shaft 101 at the inner end of which is a gear 102 meshing with rack teeth cut in the right hand tool carrier bar 15 so as to traverse the tool carrier with respect to the work holder.

The transmission mechanism including the three transmission shafts 55, 56 and 57 is shown as mounted in a casing 105 journaled on the shaft 57 and a handle 106 is shown in Figure 1 as secured to this casing so that it and the mechanism enclosed by it, including the worm 66, may be raised to raise the worm out of contact with the worm gear 100 so that the transmission mechanism may be entirely disconnected from the tool carrier at will similarly to the arrangement shown in the Bryant patent to which reference has heretofore been made. The shaft 56 is arranged to be moved axially at the end of the desired inward traverse limit to reverse the direction of traverse and it may be moved to reverse the direction of traverse by hand at any time. To this end the shifter fork 70 is shown as forming part of the bell crank lever 110 fulcrumed at 111 and having a substantially horizontal arm 112 provided with a wear pin 113 with oppositely inclined outer faces 114 and 115. This forms part of a load and fire mechanism, the faces 114 and 115 cooperating with mating faces 116 and 117, respectively, of a latch pin 118 outwardly spring pressed in an arm 119 of a bell crank lever 120. This bell crank lever is forked at its upper end where it is fulcrumed on the shaft 121 and it extends downwardly to form an actuating handle 122. On this handle is positioned a lug 123 which at suitable times is contacted by a dog 124 adjustably angularly secured, as, for example, to parts carried by the worm wheel 100, all as shown more in detail in the Bryant patent to which reference has already been made. By suitably setting this stop lug angularly about the axis of the traverse shafts 101, the inner limit of traverse can be determined. The outer limit of traverse may be determined by the right hand end of the shaft 15 striking on a pin 125 (Figure 1) which opens a limit switch 126 which stops the motor 50.

When the face grinding wheel 23 is in operative alinement with the work the traverse is preferably produced by hand, the traverse motor 50 having been stopped by the opening of the limit switch 126, and the grinding wheel is brought up to the work as far as is permitted by engagement of the tool carrier with a fixed stop shown at 134 in Figure 1. There are two angular positions shown in either of which the tool carrier may be positioned when the face grinding wheel is to be employed, these two positions being shown for the grinding wheel in the two dot and dash circles at 135 and 136, respectively, in Figure 4. For supporting the tool carriage in the angular position in which the face grinding wheel is in the position shown in the circle at 135, a guide strip 140 is secured to the upper face 141 of a frame portion of the machine. This guide strip 140 has an edge portion 140a with which may contact the end of a shoe 142 carried by a pin 143 slidably mounted in the tool carrier portion 21. A spring 144 surrounding the pin 143 and seated in a socket 145 in the member 21 normally holds this shoe 142 depressed with a head 146 secured by a pin 147 to the pin 144 in contact with a portion of the member 21. This shoe 142 is provided with an inclined latch face 148 which may be engaged by the edge of the plate 140 and caused to retract against the action of the spring 144 when the tool carrier is swung from boring position to the position with the facing grinding wheel in the position of the dash and dotted line circle 135. In this position of the parts the boring tool is out of operative alinement with the work and the grinding wheel is in operative alinement, so that by manipulation of the hand wheel 150 on the shaft 101 the tool carriage may be moved to present the facing tool against the work as far as is permitted by the stop 130. In some cases, however, this position of the tool carriage may not be satisfactory for the reason that on account of the work holder being of large diameter the boring tool may not clear the work holder in this angular position of the tool carrier. When this is the situation the tool carriage may be swung further in the same direction to bring the face grinding wheel into the position shown in the dash and dotted circle 136. This brings the shoe 142 into position to engage on the wear piece 155 at the edge of the frame piece 141 and removes the axis of the boring tool 31 into the dotted line position shown at b in Figure 4 from the dotted line position shown at a in this figure, when the shoe 142 is in engagement with the piece 140. This results in the boring bar being swung sufficiently away from axial alinement so that it may clear the largest work holder which can be used in this machine.

Provision is preferably made for automatically controlling the mechanisms for the various units so that when the boring tool is in axial alinement with the work, the work is rotated at its high rate of speed and the traverse mechanism is operative, but when the tool carrier is swung to a position where the face grinding wheel is in operative alinement with the work, the work is rotated at its low rate of speed and the grinding wheel is rotated. This may be done by a control mechanism shown diagrammatically in Figure 13. A switch, preferably of the mercury tube type shown at 170, may be movable with the tool carrier. As shown it is secured to a counterweight 171 fixed to one end of the rock shaft 15 which acts to partly counterbalance the weight of the tool carrier to facilitate swinging it from one to another of its positions. In the position shown in full lines in Figure 13, this counterweight is in the position corresponding to that in which the boring tool is in operative alinement with the work and in this position it makes contact between the wires 172 and 173.

The power line 176 connects through the lines 177 and 178 with the switch solenoid 175 which controls the motor 50. It returns from this solenoid through the line 179 and the limit switch 126 back to the power line 180, so that motor 50 driving the tool carriage traverse mechanism is in operation. The third power line 195, a three phase alternating current distribution network being shown, connects through the respective control switches with the motors 50, 8, 9 and 27. Likewise the motor 8 which rotates the work at high speed is energized through the energization of the controlling solenoid 174 which derives current through lines 182 from the power line 176, through the mercury switch 170 to the line 179, and through the limit switch 126 to the power line 180. The slow motor 9 and the grinding wheel motor 27 are then de-energized, their respective control solenoids 185 and 186 being de-energized. This condition continues until the limit switch 126 is opened, whereupon both the motors 8 and 50 are de-energized. The operator then swings the tool bar into either of the dotted line positions shown in Figure 13, depending upon which one of these dotted line positions is suitable for the work in hand as previously described. He then starts the traverse of the tool carrier by hand toward the work, whereupon the limit switch 126 closes. This immediately starts the motor 50 which is not affected by the position of the mercury switch 170 and in this angular position of the tool carrier the magnets 185 and 186 are energized to start the low speed motor 9, which drives the work at its slow speed and to start the rotation of the facing grinding wheel motor 27. The starting of these two motors 9 and 27 is produced by energization of their respective control magnets 185 and 186, these magnets being connected through the lines 188 and 190 to the power line 176, and through the leads 191 and 192 and the lead 187 with the lead 179, which connects through the limit switch to the power line 180. As the facing wheel approaches the work the operator, by manipulation of the handle 106 lifts the traverse driving mechanism off from the worm wheel 100 and manipulates the tool carrier up to its final stop position by turning the hand wheel 150.

If desired, the boring tool, when in operative alinement with the work, may be caused to move transversely of its line of traverse, and to this end the portion 40 of the tool slide may carry, in place of the member 41, any desired type of former cam, examples of which are illustrated in Figures 14 to 18. In Figure 14 the former slide 200 is provided with an angular face portion 201 against which may travel the cam follower 202 which may be used in place of the roll 42 shown in Figure 4. This will impart to the boring tool 32 a corresponding motion so as to bore the work with an internal variable diameter conforming to the contour of the forming cam 200, as is shown in Figure 15. In Figures 17 and 18 a former cam 205 is shown, particularly designed for controlling the tool to bore tapered holes. As shown in Figures 17 and 18 this cam 205 is angularly adjustable on a supporting member 206 which may be secured directly to the arm 40 of the tool carrier. The members 205 and 206 may be adjustably secured together by means of the bolts 208 passing through arcuate slots 209 in the former cam 205, these arcuate slots being described about the pivot 210 between the parts 205 and 206 as a center. The angular extent of adjustment may be indicated by the pointer 211 on one of these parts, cooperating with a scale at 212 on the other. By the use of these parts a tapered bore corresponding to the setting of the edge 212 of the former cam which cooperates with a roller 42 of the member 43 may be made on the work as illustrated at 214 in Figure 16.

From the foregoing description of certain embodiments of this invention it should be evident to those skilled in the art that various changes and modifications might be made without departing from the spirit or scope of this invention as defined by the appended claims.

We claim:

1. A work cutting machine having a rotary work holder, means for rotating said holder, a tool carrier, a boring tool and a rotary facing tool on said carrier, means for rotating said facing tool, means for moving said carrier and holder relatively to selectively present either tool in operative position, and means for moving said holder and carrier in definitely related paths when said tools are selectively presented to cause boring and facing to be accurately related to the axis of rotation of the work and thus to each other in predetermined relation.

2. A work cutting machine having a rotary work holder, means for rotating said holder, a tool carrier, a rotary boring tool and a rotary facing tool on said carrier, means for rotating said facing tool, means for moving said carrier and holder relatively to selectively present either tool in operative position, and means for moving said holder and carrier in definitely related paths when said tools are selectively presented to cause boring and facing to be accurately related to the axis of rotation of the work in predetermined relation.

3. A work cutting machine having a rotary work holder, means for rotating said holder, a tool carrier, a boring tool and a facing rotary grinding wheel, means for rotating said wheel on said carrier, means for moving said carrier and holder relatively to selectively present either said tool or said wheel in operative position, and means for moving said holder and carrier in definitely related paths when said tool and wheel are selectively presented to cause boring and facing to be accurately related to the axis of rotation of the work and thus to each other in predetermined relation.

4. A work cutting machine having a rotary work holder, means for rotating said holder, a tool carrier, a boring cutter non-rotatable with respect to the axis of rotation of said work holder and a face grinding wheel on said carrier, and means for moving said carrier and holder relatively to selectively perform boring and facing operations on work carried by said work holder both accurately symmetrical to the rotational axis of the work.

5. A work cutting machine having a rotary work holder, means for rotating said holder, a tool carrier, a boring cutting tool non-rotatable with respect to the axis of rotation of said work holder and an external cutting tool carried by said carrier, means for moving said work holder and tool carrier relatively in one path to bring either selected tool into operative condition, and means for moving said work holder and tool carrier in another path to cause the selected tool to act on the work and each in accurate symmetrical relation to the rotational axis of the work.

6. A machine of the class described, having a rotary work holder, means for rotating said holder, a tool slide, a boring cutter non-rotatable with respect to the axis of rotation of said work holder and a grinding wheel carried by said slide, means for moving said slide transverse to its sliding direction to bring either said cutter or said grinding wheel into operative alinement with work on said work holder, and means for sliding said slide from and toward the work, whereby boring and facing operations are accurately symmetrical to the axis of rotation of the work and thus accurately related to each other.

7. A machine of the class described, having a rotary work holder, means for rotating said holder, a tool slide pivotally mounted to swing transverse to its sliding direction, a non-rotary boring tool and an external cutting tool mounted on said slide, means for swinging said slide about its pivot to bring either of said tools into operative alinement with work on said holder, and means for sliding said slide toward and from the work.

8. A machine of the class described having a work holder, a tool slide mounted to move transverse to its sliding movement, a non-rotating boring tool and a rotary grinding wheel carried by said slide, means to rotate said grinding wheel, means to rotate said work holder, means for moving said slide transversely to bring either said tool or said wheel into operative alinement with work on said work holder, and means for automatically traversing said slide in its sliding path when said boring tool is in operative alinement with said work.

9. A machine of the class described having a work holder, a tool slide mounted to move transverse to its sliding movement, a non-rotating boring tool and a rotary grinding wheel carried by said slide, means to rotate said grinding wheel, means to rotate said work holder, means for moving said slide transversely to bring either said tool or said wheel into operative alinement with work on said work holder, and means controlled by the transverse position of said slide for controlling the speed of rotation of said work holder.

10. A machine of the class described having a work holder, a tool slide mounted to move transverse to its sliding movement, a non-rotating boring tool and a rotary grinding wheel carried by said slide, means to rotate said grinding wheel, means to rotate said work holder, means for moving said slide transversely to bring either said tool or said wheel into operative alinement with work on said work holder, and means controlled by the transverse position of said slide to rotate said work holder at a relatively high speed when said boring tool is in opposite alined position and at a relatively low speed when said wheel is in operative alined position.

11. A machine of the class described having a work holder, a tool slide mounted to move transverse to its sliding movement, a non-rotating boring tool and a rotary grinding wheel carried by said slide, means to rotate said grinding wheel, means to rotate said work holder, means for moving said slide transversely to bring either said tool or said wheel into operative alinement with work on said work holder, means for automatically traversing said slide in its sliding path when said boring tool is in operative alinement with said work, and means controlled by the transverse position of said slide for controlling the speed of rotation of said work holder.

12. A machine of the class described having a work holder, a tool slide mounted to move transverse to its sliding movement, a non-rotating boring tool and a rotary grinding wheel carried by said slide, means to rotate said grinding wheel, means to rotate said work holder, means for moving said slide transversely to bring either said tool or said wheel into operative alinement with work on said work holder, means for automatically traversing said slide in its sliding path when said boring tool is in operative alinement with said work, and means controlled by the transverse position of said slide to rotate said work holder at a relatively high speed when said boring tool is in operative alined position and at a relatively low speed when said wheel is in operative alined position.

13. A machine of the class described, having a work holder, means for rotating said holder, a tool slide, a boring tool on said slide, means for effecting traverse of said slide to cause said tool to penetrate and then retract from work carried by said holder while maintained in cutting relation to the work, and means for automatically changing the speed of traverse with the change of direction thereof to provide for roughing and finishing cuts in accordance with the direction of traverse.

14. A machine of the class described, having a rotary work holder, means for rotating said holder, a tool carrier, a pair of tools on said carrier, means for moving said holder and carrier relatively to present either tool in operative relation to work on said holder, and means controlled by and responsive to said relative positioning determining the speed of rotation of said holder produced by said rotating means.

15. A machine of the class described, having a rotary work holder, a drive shaft for rotating said holder, a relatively high speed motor for driving said shaft, a relatively low speed motor, means including an over-running clutch connecting said low speed motor and shaft, a tool carrier, a pair of tools carried by said carrier, means for moving said carrier to bring either tool into operative relation to work carried by said holder, and means controlled by the position of said carrier for controlling the energization of said motors whereby to rotate said holder at a relatively high speed when one of said tools is in operative position and to rotate said holder at a lower speed when the other of said tools is in operative position.

16. A machine of the class described, comprising a pair of members, one of said members being a work holder and the other of said members being a tool carrier, means for moving one of said members relative to the other member to effect traverse of a tool carried by said carrier on work carried by said holder, and traversing mechanism interposed between said one member and moving means including a reversing shaft, means for automatically and alternately interposing said shaft in and removing it from said train to cause traverse in opposite directions, a pair of connections for said reversing shaft one of which causes return traverse at substantially the same speed as forward traverse and the other of which causes return traverse at a substantially different speed from forward traverse, and means for selectively rendering either of said connections operative.

17. A machine of the class described, comprising a pair of members, one of said members being a work holder and the other of said members being a tool carrier, means for moving one of said members relative to the other member to effect traverse of a tool carried by said carrier on work carried by said holder, and traversing mechanism interposed between said one member and moving means including a reversing shaft, means for automatically and alternately interposing said shaft in and removing it from the train of said mechanism to cause traverse in opposite directions, a pair of connections of different speed ratios for said reversing shaft, and means for selectively rendering either of said connections operative.

18. In a machine of the class described, comprising a rotary work holder, a relatively high speed motor and a relatively low speed motor selectively driving said work holder, a tool slide, means for traversing said slide, a motor for actuating said traversing means, a grinding wheel and a boring tool carried by said slide, means for moving said slide laterally of its sliding path to selectively bring said wheel or said tool into operative alinement with work on said holder, grinding wheel driving means, and means controlled by the lateral position of said slide to control said motors and wheel-driving means.

19. In a machine of the class described, comprising a rotary work holder, a relatively high speed motor and a relatively low speed motor selectively driving said work holder, a tool slide, means for traversing said slide, a motor for actuating said traversing means, a grinding wheel and a boring tool carried by said slide, means for moving said slide laterally of its sliding path to selectively bring said wheel or said tool into operative alinement with work on said holder, grinding wheel driving means, and means controlled by the lateral position of said slide to cause said relatively high speed motor to rotate the work and said slide traversing means to operate when said tool is in operative alinement with the work, and to cause said relatively low speed motor to rotate the work and said wheel-driving means to be operative when said wheel is in operative alinement with the work.

20. In a machine of the class described, comprising a rotary work holder, a relatively high speed motor and a relatively low speed motor selectively driving said work holder, a tool slide, means for traversing said slide, a motor for actuating said traversing means, a grinding wheel and a boring tool carried by said slide, means for moving said slide laterally of its sliding path to selectively bring said wheel or said tool into operative alinement with work on said holder, grinding wheel driving means, means controlled by the lateral position of said slide to control said motors and wheel-driving means, and a stop to limit the approach of said wheel to said work holder.

21. A machine of the class described having a work holder, means for rotating said holder, a boring tool movable relative to said holder in the direction of the axis of rotation of said holder to enter from one face of work carried by said holder and to withdraw from said face, and means for producing such movement at a relatively rapid rate into the work to effect a roughing cut thereon, and at a relatively slow withdrawal rate to effect a finishing cut on the work.

22. A machine of the class described, comprising a work holder, a tool carrier, a non-rotating boring tool on said carrier, means for rotating said work holder, means for traversing said carrier and holder relatively lengthwise of the axis of rotation of said holder, means acting while said tool is in traversing alinement with work on said holder for moving said holder and carrier relatively in a different direction to thereby cut a hole in the work of variable diameter axially thereof, and means causing said traverse to be at different speeds in opposite directions.

23. A machine of the class described, comprising a work holder, a tool carrier mounted for pivotal movement and movement axially of its pivot, means for rotating said work holder about an axis substantially parallel to said pivot axis, a non-rotary boring tool on said carrier, means for moving said carrier axially to effect traverse between said tool and work on said holder, cam means for rocking said carrier about its pivot as it is being traversed to cause said tool to cut a hole in the work of variable diameter axially, and means causing said traverse to be at different speeds in opposite directions.

24. A machine of the class described, comprising a work holder, a tool carrier, means for moving said holder and carrier relatively to cause a tool on said carrier to traverse work on said holder, and means for selectively controlling said moving means to cause traversing in opposite directions to take place at substantially the same or at substantially different speeds.

25. A machine of the class described, comprising a work holder, a pivotally mounted tool carrier slidable in the direction of its pivotal axis toward and from the work, a pair of tools carried by said carrier, a support against which said carrier may be engaged by gravity and along which it may traverse in an angular position in which one of said tools is in operative alinement with work on said holder, a second and a third support, and a member movably carried by said carrier and in one position supporting said carrier selectively from either said second or third support with said one tool above operative alinement and the other tool in operative alinement with work on said work holder.

26. A machine of the class described having a work holder, a tool slide mounted to move transverse to its sliding movement, a boring tool and a grinding wheel carried by said slide, means to rotate said grinding wheel, means to rotate said work holder, means for moving said slide transversely to bring either said tool or said wheel into operative alinement with work on said work holder, and means for automatically traversing said slide in its sliding path and at different rates of speed in opposite directions and while said boring tool is in operative alinement with the work and in position to operate thereon.

27. A machine of the class described comprising a work holder, a tool, means for relatively moving said tool and holder to effect traverse of said tool along work held by said holder, and means causing said traverse in one direction to be relatively rapid to effect a roughing cut on the work, and relatively slow in the opposite direction to effect a finishing cut on the work.

28. In a machine of the class described, parts comprising a work holder and a boring tool, means for rotating at least one of said parts, means for relatively traversing said parts to effect boring cuts on the work, and means for causing the first direction of traverse to be effected rapidly relative to said rotation to produce a roughing cut and the second direction of traverse to be slower relative to said rotation to effect a finishing cut.

29. In a machine of the class described, parts comprising a work holder and a tool, means for rotating at least one of said parts, means for relatively traversing said parts to effect cuts on the work, means for causing the first direction of traverse to be effected rapidly relative to said rotation to produce a roughing cut and the second direction of traverse to be slower relative to said rotation to effect a finishing cut, and means for feeding the tool between said roughing and finishing cuts.

30. In a machine of the class described, parts comprising a work holder and a boring tool, means for rotating at least one of said parts, means for relatively traversing said parts to effect boring cuts on the work, means for causing the first direction of traverse to be effected rapidly relative to said rotation to produce a roughing cut and the second direction of traverse to be slower relative to said rotation to effect a finishing cut, and means for feeding the tool between said roughing and finishing cuts.

MERTON H. ARMS.
JOSEPH B. JOHNSON.